UNITED STATES PATENT OFFICE.

SOREN C. MADSEN, OF SLEEPY EYE, MINNESOTA.

METHOD OF PRODUCING MARBLED SURFACES.

SPECIFICATION forming part of Letters Patent No. 458,764, dated September 1, 1891.

Application filed December 12, 1890. Serial No. 374,498. (No specimens.)

*To all whom it may concern:*

Be it known that I, SOREN C. MADSEN, a citizen of the United States, residing at Sleepy Eye, in the county of Brown and State of Minnesota, have invented certain new and useful Improvements in the Method of Producing Marbled Surfaces; and I do declare the following to be a full, clear, and exact description of the invention, such as will enable others skilled in the art to which it appertains to make and use the same.

My invention has relation to the method of producing marbled surfaces. It is described as follows: Place a piece of clear glass over a sensitized surface, (paper or otherwise.) Then sprinkle on the upper surface of the glass in irregular patches sand, broken glass, and broken smoked glass with the smoke partially rubbed off in places. This material must be so distributed as to leave the surface of the glass almost clear in spots and nearly opaque in others. Then expose to the direct undiffused sunlight or artificial light and the marbled appearance will be produced or printed on the sensitized surface.

Having described my invention, what I claim as new, and desire to secure by Letters Patent, is—

The method of producing marbled surfaces by means of sand, broken glass, and broken smoked glass sprinkled over the suface of a clear glass placed over a sensitized surface and then exposed to the sun's rays or artificial light, substantially as described.

In testimony whereof I affix my signature in presence of two witnesses.

SOREN C. MADSEN.

Witnesses:
S. G. DAVIS,
W. A. WHEELER.